W. C. FRANCIS.
FERTILIZER DISTRIBUTER.
APPLICATION FILED DEC. 16, 1912.
1,090,293.
Patented Mar. 17, 1914.
2 SHEETS—SHEET 1.
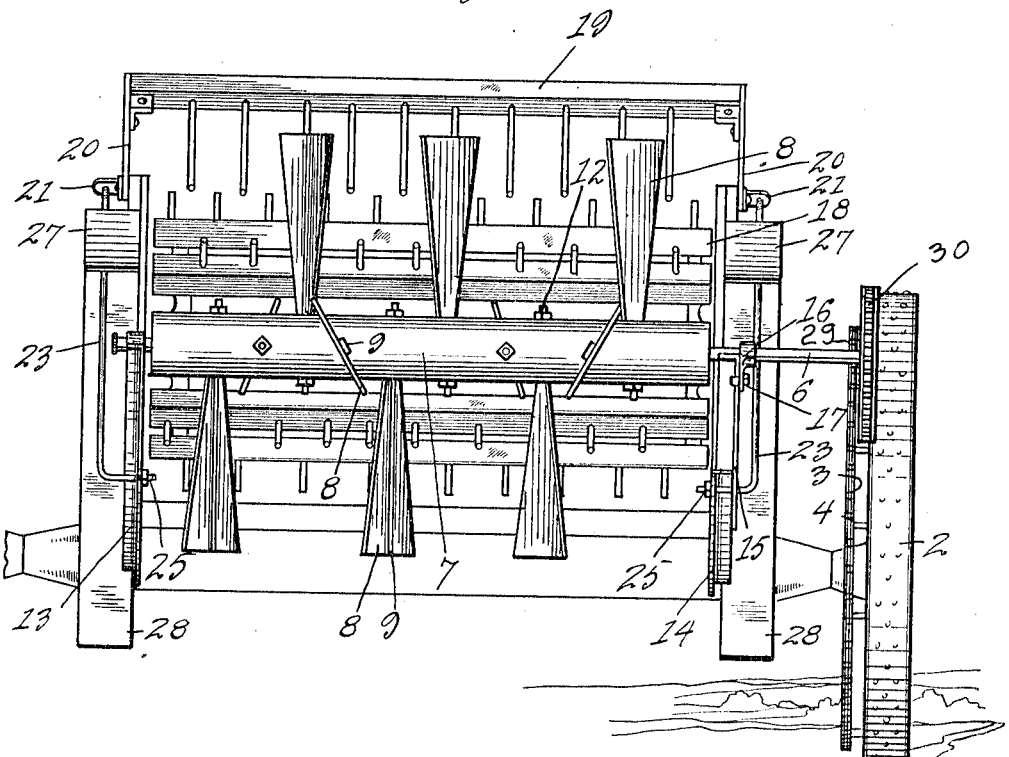
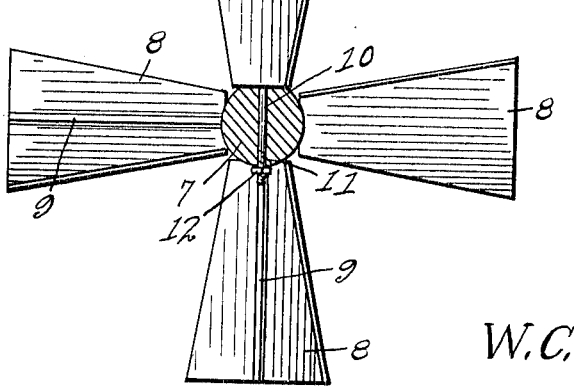
Witnesses
Robert M. Zutphent.
A. S. Hind.
Inventor
W. C. Francis.
By Watson E. Coleman
Attorney

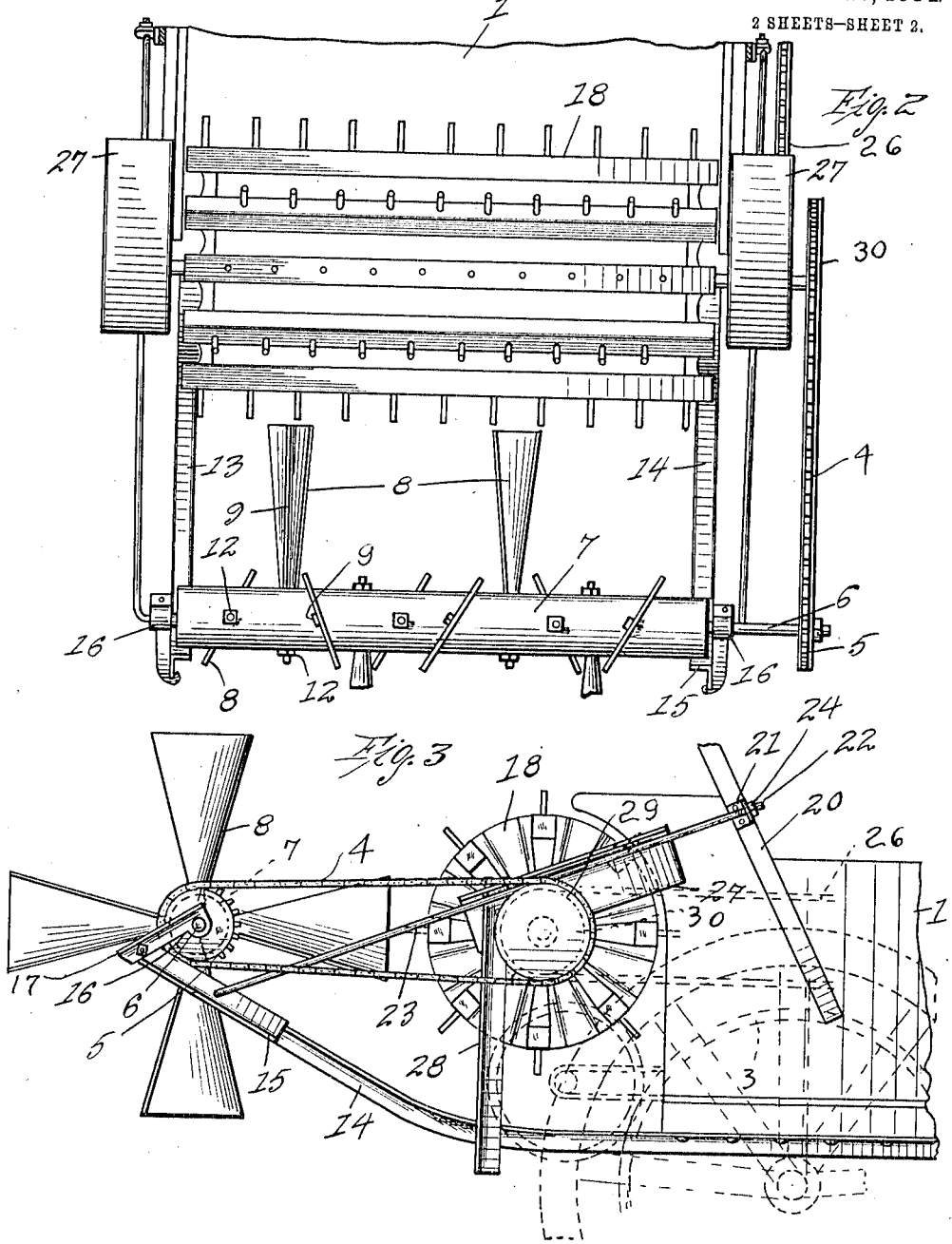

UNITED STATES PATENT OFFICE.

WILLIAM C. FRANCIS, OF BRISTOL CENTER, NEW YORK.

FERTILIZER-DISTRIBUTER.

1,090,293.  Specification of Letters Patent.  Patented Mar. 17, 1914.

Application filed December 16, 1912. Serial No. 737,157.

*To all whom it may concern:*

Be it known that I, WILLIAM C. FRANCIS, a citizen of the United States, residing at Bristol Center, in the county of Ontario and State of New York, have invented certain new and useful Improvements in Fertilizer-Distributers, of which the following is a specification, reference being had to the accompanying drawings.

This invention relates to farming implements and more particularly to fertilizer distributers.

An object of the invention is to provide a distributer having an attachment at its rear end for spreading the fertilizer and distributing the same over a large area of ground.

Another object of the invention is to provide a spreader with an attachment of the above stated character securely held a spaced distance from the pulverizing drum and separating rake, the distributer attachment being mounted in such manner that it is operated by the rear wheels of the machine and may be readily raised or lowered, as occasion may require.

Another object is to generally improve and simplify the construction of devices of this character and thereby increase the efficiency thereof.

With these and other objects in view, this invention consists in the novel details of construction, combination and arrangements of the parts that I shall hereinafter more fully describe, claim, and point out in the accompanying drawings, in which—

Figure 1 is a rear view of a fertilizer distributing machine with my spreader and distributer attachment applied thereto. Fig. 2 is a top plan view of Fig. 1. Fig. 3 is a side elevation, and Fig. 4 is a sectional view through the spreader and distributer attachment.

Referring more specifically to the drawings, in which similar reference characters designate corresponding parts throughout the several views, the numeral 1 designates the rear portion of a fertilizer distributing machine having the usual rear wheels 2, one of which carries the gear 3 with which the sprocket chain 26 is engaged, said chain also passing around the sprocket gear 29 to rotate the latter when the machine is in motion.

The sprocket gear 5 is mounted on one end of the shaft 6 which carries the roller 7 having the spreader and distributer plates 8 projecting in opposite directions therefrom, said blades 8 being positioned at opposite angles toward the end of the roller and being also flared toward their outer ends to throw material rearwardly and outwardly in a wide path. The object of having the ends flared and positioned at various angles is to fan or distribute the fertilizer to opposite sides of the machine 1, and fan or throw the fertilizer with sufficient force to distribute the same for some distance to either side of the machine.

Each blade 8 is secured to the roller 7 by means of a securing strip 9 fastened to one side of the blade and extending longitudinally thereof, one end of the securing strip 9 being extended beyond the inner end of the blade for engagement through an opening 10 provided therefor through the roller 7. The free extremity of the strip 9 is threaded, as shown at 11, to receive the securing nut 12, thus securely fastening the blade to the roller. The strip 9 also serves to reinforce and strengthen the blade, as will be clearly apparent.

The shaft 6 has one end mounted in the free end of the angle iron 13, one end of which is secured to the under face of the machine body 1, the free end thereof being extended rearwardly of the machine body 1 and then curved upwardly, as clearly shown in the drawings. A similar angle iron 14 is secured to the under face of the machine body 1 and has its free end extended rearwardly thereof and curved upwardly to correspond with the free end of the angle iron 13, said angle irons 13 and 14 being parallel and positioned at opposite sides of the machine body. The angle iron 14, however, is shorter than the angle iron 13, and is provided with an extension 15, one end of which is secured to the edge of one angle of the iron 14 and is parallel with the other or vertical angle of said iron, the extension 15 extending upwardly and rearwardly from the end of the iron 14.

To the free end of the extension 15 is secured one end of the bearing bracket 16, within the other end of which is received the second end of the shaft 6, said end extending through the bearing bracket 16 and having the sprocket gear 5, previously mentioned, secured upon its extremity. By mounting the second end of the shaft 6 in this manner, said end may be readily raised or lowered to adjust the same as required, and secured in adjusted position by means of the bolt 17 securing the member 16 to the extension 15.

The distributer and spreader attachment proper comprising the drum 7 and blades 8, is positioned rearwardly of the pulverizing drum 18 in the rear of the machine body 1. It will be understood that the drum 18 is of the ordinary construction and mounted for rotation in the usual manner. The separating rake 19 is positioned above the drum 18 and carried in the opposite upper ends of the supporting standards 20, which extend upwardly and rearwardly and have their lower ends secured to the sides of the wagon body in any preferred and well known manner.

Secured to each standard 20 is an angle iron 21, through the free angle of which extends the upper threaded end 22 of a bracing rod 23, a nut 24 being secured upon said threaded end. The lower end of each bracing rod 23 is bent at a right angle, and extended through the upwardly directed portion of the adjacent supporting angle iron serving to support the shaft 6, after which a nut 25 is placed upon the bent end to prevent disengagement thereof from the angle iron. It will be understood that the angle irons 21 are L-shaped and simply large enough to serve the purpose for which they are intended, and, therefore, differ from the long angle irons 13 and 14.

It will be understood that the drum 18 is operated by the usual mechanism, a portion of the chain 26 of which is indicated by dotted lines in Fig. 3, and this mechanism is protected by the curved guard plates 27 and 28, thus preventing the mechanism from becoming clogged by the fertilizer. It will be seen that each bracing rod 23 passes beneath one of the upper guard plates 27 and 28. It will be seen that as the chain 26 is engaged around the sprocket gear 29 on the shaft of the pulverizing drum 18, said drum is rotated thereby, and the shaft 6 is rotated by the chain 4 engaged around a second sprocket wheel 30 on the shaft of the pulverizing drum and around the sprocket gear 5 of said shaft 6.

The shaft 6 may be securely held in position by tightening the nuts 24 on the upper ends of the rods 23, thus drawing the rods upwardly and slightly raising the free ends of the long angle irons 13 and 14 on which the shaft is mounted until said rods are tight, thus preventing play of the free ends of the irons, as will be clearly apparent.

From the foregoing, it will be evident that I have provided a spreader and distributer attachment for fertilizer distributing machines which may be readily adjusted and which will be highly efficient and effective in use.

What is claimed is:—

1. The combination with a fertilizer distributer machine including a pulverizing drum, a separating rake, means for supporting the separating rake; of a rotary shaft, means for mounting the rotary shaft outwardly of and parallel with the pulverizing drum, means for adjusting one end of the shaft, a drum mounted on the shaft, outwardly flared blades projecting from the drum, means for securing the outwardly flared blades to the drum, and means connected with the shaft mounting means and with the separating rake supporting means for bracing said shaft mounting means to said separating rake supporting means.

2. The combination with a fertilizer distributing machine including a pulverizing drum and separating rake, and means for supporting the separating rake, of angle irons projecting from the end of the machine, a rotary drum mounted in the free ends of the angle irons, spreader blades mounted on said drum, brace rods connected with the angle irons and with the separating rake supporting means, means for drawing the rods forwardly and retaining the same in position to brace the free ends of the angle irons, and means for rotating the last mentioned drum.

3. The combination with a distributing machine including a pulverizing drum, a separating rake, and means for supporting the separating rake, of a rotary shaft, curved angle irons for mounting the rotary shaft outwardly of and parallel with the pulverizing drum, said angle irons being secured to the machine, a spreader drum mounted upon the rotary shaft, spreader blades carried by said shaft, means for adjusting the spreader drum within the angle irons, and means connected with the angle irons and with the separating rake supporting means for bracing said angle irons.

In testimony whereof I hereunto affix my signature in the presence of two witnesses.

WILLIAM C. FRANCIS.

Witnesses:
Wm. A. Reed,
F. M. Pierce.